2,941,016

PROCESS FOR PREPARING AROMATIC HYDROCARBONS

Arie Schmetterling and Werner Dimmling, Frankfurt am Main, Germany, assignors to Farbwerke Hoechst Aktiengesellschaft vormals Meister Lucius & Brüning, Frankfurt am Main, Germany, a corporation of Germany No Drawing. Filed Nov. 5, 1957, Ser. No. 694,529

12 Claims. (Cl. 260—673.5)

The present invention relates to a process for the manufacture of aromatic hydrocarbons.

It is known that aliphatic hydrocarbons containing at least 6 carbon atoms can be converted into aromatic substances having the same number of carbon atoms. It is also known that polymeric hydrocarbons can be split into the monomers by being passed over cracking catalysts.

Now we have found that aromatic hydrocarbons containing fewer carbon atoms than the initial substance are obtained by passing polymerization products containing at least 9 and at most 16 carbon atoms and obtained from olefinic aliphatic hydrocarbons all of which contain the same number of carbon atoms, viz. hydrocarbons containing either 3 or 4 carbon atoms, or their hydrogenation products, at elevated temperatures, over known aromatization catalysts, thus depolymerizing and aromatizing them in one step. The aromatic hydrocarbons thus obtained are generally poorer in carbon (by the number of carbon atoms of one monomer) atoms than the aliphatic hydrocarbons used for their manufacture.

The aforesaid aliphatic hydrocarbons may also be used in admixture with dimerization products of the abovementioned hydrocarbons which contain 6 or 8 carbon atoms.

The process of the present invention can be applied with special advantage for the aromatization of tri-isobutylene which may be used, if desired, in admixture with di-isobutylene. This operation has the unexpected result that the tri-isobutylene is chiefly transformed into para-xylene. This means that it is in the first place an isobutylene molecule that is split off from the tri-isobutylene under the reaction conditions while the remaining hydrocarbon residue is converted into para-xylene. The definite decomposition had not been known prior to this invention and was very surprising. Owing to this decomposition it is no longer necessary in the manufacture of aromatic hydrocarbons having a fewer number of carbon atoms first to crack and in a second step to aromatize the starting materials used for the present invention.

The reaction according to this invention can be carried out at temperatures ranging between about 400 and 650° C. and, if desired, in the presence of a carrier gas. Suitable carrier gases are, for example, hydrogen, nitrogen, methane and other low molecular hydrocarbons containing 1 to 4 carbon atoms, the latter being suitable for use in this process only at temperatures below 550° C. The most appropriate of these carrier gases is hydrogen.

The optimum range of temperature in a given case depends upon the polymeric hydrocarbon used and can easily be ascertained by those skilled in the art. When reacting tri-isobutylene and tetra-propylene it is, for example, preferable to operate at temperatures ranging from 475° to 550° C.

As catalysts for the process of the present invention there may be used the known aromatization catalysts, for example those consisting of metal oxides of the 6th group of the periodic system and/or mixed compounds and/or mixtures of these oxides with one another and/or mixtures of these oxides with the oxides of titanium, zirconium, thorium or vanadium, if desired, also containing additions of platinum metal or palladium metal, with or without carriers consisting of oxides of the 3rd group of the periodic system and, if desired, containing as activators oxides of the alkali metal group and/or the alkaline earth metal group and/or the group of rare earth metals.

Particularly suitable catalysts are those consisting of chromium oxide, potassium oxide, cerium oxide and gamma-aluminum oxide and in which the proportions of these oxides may vary respectively within the ranges of 5 to 40, 1 to 10, 0.5 to 5 and 93.5 to 45 percent. Catalysts consisting of chromium oxide/aluminum oxide and platinum metal or palladium metal can also be employed. Suitable catalysts for the process of the invention are, for example, chromium oxide and the following mixed catalysts: Chromium oxide/aluminum oxide; tungsten oxide/aluminum oxide; chromium oxide/molybdenum oxide/aluminum oxide; molybdenum oxide/aluminum oxide; chromium oxide/zinc oxide/aluminum oxide; chromium oxide/zirconium oxide/aluminum oxide; chromium oxide/thorium oxide/aluminum oxide; chromium oxide/titanium oxide/aluminum oxide; chromium oxide/platinum metal/aluminum oxide; chromium oxide/palladium metal/aluminum oxide; chromium oxide/sodium oxide/aluminum oxide; chromium oxide/potassium oxide/aluminum oxide; chromium oxide/potassium oxide/aluminum oxide/cerium oxide; chromium oxide/potassium oxide/aluminum oxide/platinum metal; chromium oxide/potassium oxide/aluminum oxide/platinum metal/cerium oxide; chromium oxide/magnesium oxide/aluminum oxide; chromium oxide/molybdenum oxide/aluminum oxide/vanadium oxide; aluminum oxide/vanadium oxide/zinc oxide/chromium oxide; chromium oxide/calcium oxide/zinc oxide/aluminum oxide.

The catalysts advantageously contain at least 2 percent and at most 100 percent of the oxides or mixtures of the oxides of chromium, molybdenum and tungsten, preferably chromium oxide and molybdenum oxide. In some cases the use of chromium oxide is of particular advantage. These oxides may suitably be applied on carriers of aluminum oxide. For the process of the invention there come also into consideration catalysts containing, in addition to the oxides of chromium, molybdenum and tungsten, if desired also in addition to aluminum oxide, 0.1 to 30 percent of the oxides of titanium, zirconium, thorium, or vanadium as well as 0.5 to 5 percent of the rare metal oxides, preferably of cerium, and 1 to 10 percent of alkali metal oxides and 0.5 to 20 percent of alkaline earth metal oxides or zinc oxide, and 0.1 to 5 percent of palladium or platinum metal. Instead of a single oxide or metal, in all these cases a mixture of several oxides or metals of the aforesaid groups may be used.

The amounts of aluminum oxide used for preparing the above-mentioned catalysts vary within the following ranges: From 0 to 98% when—apart from aluminum oxide—only oxides of chromium, molybdenum and tungsten are present; from 0 to 97% when alkali metal oxides are also used; from 0 to 97.5% when in addition to the oxides of chromium, molybdenum and/or tungsten the catalysts contain oxides of magnesium, calcium, strontium, barium and zinc or mixtures of these oxides; from 0 to 97.9% when besides the oxides of chromium, molybdenum and tungsten or mixtures of these oxides there are present oxides of titanium, zirconium, thorium and vanadium or mixtures of these oxides; from 0 to 96.5% when rare earth metal oxides as well as alkali metal oxides are added to the oxides of chromium or molybdenum or tungsten or to the mixtures of these oxides; from 0 to 96.4% when the catalyst also contains oxides of titanium, zirconium, thorium and vanadium or mixtures of these oxides; from 0 to 96.9% in catalysts of the last-mentioned kind but not containing rare earth metal oxides; from 0 to 97.9% when in addition to oxides of chromium, molybdenum and tungsten there are added platinum and/or palladium; from 0 to 96.9% in catalysts containing also alkali metal oxides; from 0 to 96.4% in catalysts containing in addition thereto rare earth metal oxides. The aluminum oxide may be present in any desired form, gamma-aluminum oxide being, however, especially suitable.

The oxides of tungsten, molybdenum and chromium are advantageously applied in quantities of 10 to 20 percent. It is furthermore of advantage to add these oxides to the catalysts in quantities at least equal to or larger than the total of all other active or activating additions, the aluminum oxide not being considered as an active or activating substance.

The aluminum oxide acts exclusively as a carrier, whereas the oxides of titanium, zirconium and thorium show a slightly aromatizing action. A stronger aromatizing effect is produced by vanadium, which effect is still further enhanced in the case of the group consisting of chromium, molybdenum and tungsten, chromium oxide being most effective in the formation of para-xylene by aromatization.

As activators for the preparation of para-xylene there can preferably be used alkali metal oxides, such as potassium oxide in admixture with rare earth metal oxides, for example cerium oxide. Other activators, such as alkaline earth metal oxides, zinc oxide and magnesium oxide further increase the yield of aromatic substance; however, the proportion of para-xylene then sometimes amounts only to 30 percent.

For carrying out the process of the invention the method of preparing the catalyst is also important. The components may be precipitated together or mixed with one another, but it is more advantageous to absorb the active components on the surface of the contact acting as carrier. A suitable contact is obtained by precipitating aluminum hydroxide from an aluminum nitrate solution with an equivalent quantity of an ammonia solution of 15 percent strength, and heating the aluminum hydroxide at 750° C. for 5 hours to convert it into γ-aluminum oxide. The resulting mass is broken up into small pieces and the particle grains of a diameter of 3 to 5 millimeters are sieved out. A solution of chromic acid, potassium nitrate and cerous nitrate is added dropwise to the particles so that the whole of the solution is absorbed, and while shaking to ensure uniform distribution 150 grams of the granular aluminum oxide completely absorb a solution of 31.5 grams of chromic acid, 4.5 grams of potassium nitrate and 1.5 grams of cerous nitrate in 110 cc. of water. After drying the particles for 3 hours at 550° C. and reduction in a current of hydrogen, the catalyst is ready for use.

When, for example, tri-isobutylene which is the polymerization product of isobutylene is passed over a chromium oxide/potassium oxide/cerium oxide/aluminum oxide catalyst a product is obtained which contains altogether 22 percent of aromatic substances which are made up of 91 percent of para-xylene, 4.5 percent of meta-xylene and 4.5 percent of toluene. Apart from the aforesaid substances the liquid product contains di-isobutylene.

The reaction according to the present invention also permits of converting, for example, polypropylene compounds into aromatic substances. For example, in the presence of a chromium oxide/potassium oxide/cerium oxide/aluminum oxide catalyst and at a temperature of 525° C. dodecylene (tetra-propylene) yields a reaction product which contains 17 percent of aromatic substances. Of this 59 percent are aromatic substances containing 9 carbon atoms, such as 1,2,4-trimethyl-benzene (pseudocumene), 1,3,5-trimethyl-benzene (mesitylene) and n-propylbenzene; 12 percent are aromatic substances containing 6 carbon atoms (benzene), the rest being xylene and toluene.

In the process of the invention the yield of para-xylene and other aromatic hydrocarbons depends on the temperature and contact time, that is the period during which the substance to be aromatized remains in the reaction zone. The higher the temperature the greater is the degree of aromatization and also the amount of splitting. In this case the latter are increased, however, to such a degree that less starting material can be recovered and consequently a smaller yield is obtained than when working at a lower temperature.

The influence of the contact time on the reaction is analogous to that of the temperature. When the contact time is increased without changing the temperature, the degree of aromatization as well as the degree to which the material is split up into aliphatic compounds of a low molecular weight rises. Since the splitting increases at a greater rate, the content of aromatic hydrocarbons and para-xylene in the liquid product is lower. If the contact time is shortened and the temperature raised in such a manner that both factors just compensate each other with respect to splitting, an increased aromatizing effect is obtained. However, the time during which cyclisation, isomerization and aromatization by dehydrogenation are to take place, must not be shortened to such an extent that insufficient dehydrogenation occurs. The process can be carried out at temperatures within the range of 400° C. to 650° C. and contact times of 0.1 to 60 seconds, and advantageously temperatures of 475° C. to 550° C. and contact times of 1 to 12 seconds.

By the process of the invention not only the diisobutylene obtained by the dimerization of isobutylene in the presence of sulfuric or phosphoric acid serving as catalyst but also the residue obtained in the course of this polymerization, which residue consists mainly of tri-isobutylene, can be transformed into aromatic substances of a definite constitution, for example into paraxylene.

The mixtures obtained by the catalytic polymerization of olefins according to the different processes and containing inter alia polymers of low molecular olefinic aliphatic hydrocarbons with at least 9 and at most 16 carbon atoms can, however, also be aromatized in an advantageous manner without any further purification, degassing or distillation being carried out. The polymers of high molecular weight contained in the crude product then split up into low molecular polymers and yield an additional amount of aromatic substances. Since the distillation cost as well as the formation of cheap undesired by-products are avoided, the process can even be economical if the yield of the aromatic substances formed is smaller and their composition is less valuable than in cases in which the same quantities by weight of the pure fractions are applied.

In the catalytic dimerization of isobutylene wherein ordinarily certain amounts of n-butylene are also present there are obtained according to the different processes, for example in the presence of sulfuric acid or phosphoric acid serving as a catalyst, crude products which, apart from di-isobutylene (2,4,4-trimethylpentene-1 and -2), always contain varying quantities, i.e. in general 10–50% of the crude product obtained by the dimerization of tri-isobutylene, traces of tetra-isobutylene and more or less great portions of copolymers, chiefly of isobutylene and n-butylene. In some processes the portions of the copolymers may amount to 50 percent and more. Since there is no suitable use for these polymers they are merely as a motor fuel. The process of the invention, however, enables them to be transformed into para-xylene, the para-xylene being obtained in the same or nearly the same yield and having the same or nearly the same purity as para-xylene obtained from pure di-isobutylene (2,4,4-trimethylpentene-1 and -2) prepared by fractional distillation or pure tri-isobutylene. Especially in the preparation of para-xylene it is of advantage to use mixtures of polymers into which as little n-butylene as possible has been polymerized as starting material for carrying out the process of the invention.

The process of the invention, accordingly, does not only avoid the high cost of distillation and the formation of by-products of inferior quality, it moreover increases the yield of para-xylene calculated on the isobutylene used for the preparation of di-isobutylene. The use of dimerization crude products for the aromatization according to the invention thus permits of a decisive simplification and reduction of the cost of the preparation of para-xylene by way of di-isobutylene.

The following examples serve to illustrate the invention but they are not intended to limit it thereto.

Example 1

160 grams per hour of tri-isobutylene vapor are passed at 500° C. over 69 cc. of a catalyst consisting of chromium oxide, potassium oxide, cerium oxide and aluminum oxide (14.0/2.1/1.4/79.8). 21 liters per hour (47.5 percent by volume) of hydrogen are introduced to serve as carrier gas. The vapor of the substance remains in the reaction chamber for 2.2 seconds. 105 grams per hour (64 percent calculated on the substance used) of a liquid product are obtained. The reaction product contains 21 grams (20 percent) of para-xylene, 1 gram (1 percent) of meta-xylene, 1 gram (1 percent) of toluene, 10.5 grams (10 percent) of di-isobutylene, and 71.5 grams (68 percent) of unreacted tri-isobutylene.

Example 2

150 grams per hour of dodecylene (tetra-propylene) vapor are passed at 525° C. together with 18 liters per hour of hydrogen over 69 cc. of the chromium oxide/potassium oxide/cerium oxide/aluminum oxide catalyst described in Example 1. The contact time amounts to 2.4 seconds. There are obtained 117 grams per hour (78 percent calculated on the substance used) of a liquid reaction product which contains 12 grams (10 percent) of pseudocumene, mesitylene and n-propyl-benzene, 2.3 grams (2 percent) of benzene and 5.8 grams (5 percent) of toluene and xylene.

Example 3

A crude polymer prepared from a mixture of 91.4 percent of isobutylene and 8.6 percent of n-butylene by dimerization over a solid contact according to a known process and containing about 7 to 8 percent of gas (chiefly isobutylene), about 68 percent of di-isobutylene (a fraction boiling at 99 to 104° C.) and about 19 percent of residue (chiefly tri-isobutylene) is aromatized under the conditions described in Example 1. There are obtained a xylene isomer mixture containing 94.8 percent of para-xylene and a liquid product containing 18 percent of para-xylene. When aromatizing a test substance of pure di-isobutylene under the same experimental conditions a xylene isomer mixture containing 94.6 percent of para-xylene and a liquid product containing 19 percent of para-xylene are obtained.

Example 4

A crude polymer prepared in a manner analogous to that described in Example 3 from a starting material consisting of 85.0 percent of isobutylene, 14.3 percent of n-butylene and 0.7 percent of saturated hydrocarbons containing 4 carbon atoms is degassed (content of dissolved hydrocarbons containing 4 carbon atoms about 6 percent). A subsequent fractional distillation yields 75.0 percent of di-isobutylene and 22 percent of residue (chiefly tri-isobutylene). For purposes of comparison the crude dimerization product which has been subjected to a degassing, the fraction obtained therefrom by fractional distillation and boiling at 99 to 104° C. and a test substance consisting of pure di-isobutylene are aromatized and the following results are obtained:

The content of para-xylene in the xylene isomer mixture amounts to 93.5 percent in the degassed crude dimerization product,
93.6 percent in the fraction boiling at 99 to 104° C.,
93.7 percent in the pure test substance.

The content of para-xylene in the liquid polymer in all three cases amounts to 23 percent. The value obtained for the crude dimerization product within the accuracy of measurement is even a little higher.

Example 5

A polymer mixture containing 11 percent of gas, 62 percent of di-isobutylene and 22 percent of residue (mainly tri-isobutylene) and prepared by selective polymerization of the isobutylene present in a mixture of 33.8 percent of isobutylene and 66.2 percent of n-butylene with the use of sulfuric acid is aromatized according to the process of Example 1. The following results are obtained:

The content of para-xylene in the xylene isomer mixture amounts to 93.3 percent in the crude polymer,
94.1 percent in the pure test substance.

The content of para-xylene in the liquid polymer amounts to 18.0 percent in the crude polymer,
19.0 percent in the pure test substance.

The results are thus the same within the accuracy of measurement.

We claim:

1. A process for preparing aromatic hydrocarbons containing less than twelve carbon atoms, which comprises heating an aliphatic hydrocarbon having substantially twelve carbon atoms, said aliphatic hydrocarbon being selected from the group consisting of polymerization products of propylene, polymerization products of the butylenes, hydrogenation products thereof, mixtures thereof, mixtures of said hydrocarbons with a lower polymer product of said olefins and hydrogenation products of such mixtures to a temperature ranging between about 400 and 650° C. in the presence of a solid oxidic cyclisation catalyst containing at least 2 percent of a metal oxide selected from the group consisting of chromium oxide, molybdenum oxide, and tungsten oxide and mixtures thereof, 0.1 to 45 percent of a metal oxide selected from the group consisting of titanium oxide, zirconium oxide, thorium oxide, and vanadium oxide and mixtures thereof, and aluminum oxide within the range of 0 to 97.5 percent, the amount of the metal oxide selected from the group consisting of chromium oxide, molybdenum oxide, and tungsten oxide and mixtures thereof being at least as high as that of all other active and activating additions together.

2. A process for preparing aromatic hydrocarbons containing less than twelve carbon atoms, which comprises heating an aliphatic hydrocarbon having substantially twelve carbon atoms, said aliphatic hydrocarbon being selected from the group consisting of polymerization products of propylene, polymerization products of the butylenes, hydrogenation products thereof, mixtures thereof, mixtures of said hydrocarbons with a lower polymer product of said olefins and hydrogenation products of such mixtures to a temperature ranging between about 400 and 650° C. in the presence of a solid oxidic cyclisation catalyst containing at least 2 percent of a metal oxide, selected from the group consisting of chromium oxide, molybdenum oxide and tungsten oxide and mixtures thereof, 0.5 percent to 5 percent of an oxide selected from the group consisting of the oxides of the rare earth metals and mixtures thereof, 1 to 10 percent of a compound selected from the group consisting of the oxides of alkali metals and mixtures thereof and aluminum oxide within the range of 0 to 96.5 percent, the amount of the metal oxide selected from the group consisting of chromium oxide, molybdenum oxide and tungsten oxide and mixtures thereof being at least as high as that of all other active and activating additions together.

3. A process for preparing aromatic hydrocarbons containing less than twelve carbon atoms, which comprises heating an aliphatic hydrocarbon having substantially twelve carbon atoms, said aliphatic hydrocarbon being selected from the group consisting of polymerization products of propylene, polymerization products of the butylenes, hydrogenation products thereof, mixtures thereof, mixtures of said hydrocarbons with a lower polymer product of said olefins and hydrogenation products of such mixtures to a temperature ranging between about 400 and 650° C. in the presence of a solid oxidic cyclisation catalyst containing at least 2 percent of a metal oxide selected from the group consisting of chromium oxide, molybdenum oxide, and tungsten oxide and mixtures thereof, 1 to 10 percent of an oxide selected from the group consisting of the oxides of the alkali metals and mixtures thereof and aluminum oxide within the range of 0 to 97 percent, the amount of the metal oxide selected from the group consisting of chromium oxide, molybdenum oxide, and tungsten oxide and mixtures thereof being at least as high as that of all other active and activating additions together.

4. A process for preparing aromatic hydrocarbons containing less than twelve carbon atoms, which comprises heating an aliphatic hydrocarbon having substantially twelve carbon atoms, said aliphatic hydrocarbon being selected from the group consisting of polymerization products of propylene, polymerization products of the butylenes, hydrogenation products thereof, mixtures thereof, mixtures of said hydrocarbons with a lower polymer product of said olefins and hydrogenation products of such mixtures to a temperature ranging between about 400 and 650° C. in the presence of a solid oxidic cyclisation catalyst comprising a content of at least 2 percent of a metal oxide selected from the group consisting of chromium oxide, molybdenum oxide, and tungsten oxide and mixtures thereof, of 0.1 to 5 percent of a metal selected from the group consisting of palladium and platinum and mixtures thereof and of aluminum oxide within the range of 0 to 97.9 percent, the amount of the metal oxide selected from the group consisting of chromium oxide, molybdenum oxide, and tungsten oxide and mixtures thereof being at least as high as that of all other active and activating additions together.

5. A process for preparing aromatic hydrocarbons containing less than twelve carbon atoms, which comprises heating an aliphatic hydrocarbon having substantially twelve carbon atoms, said aliphatic hydrocarbon being selected from the group consisting of polymerization products of propylene, polymerization products of the butylenes, hydrogenation products thereof, mixtures thereof, mixtures of said hydrocarbons with a lower polymer product of said olefins and hydrogenation products of such mixtures to a temperature ranging between about 400 and 650° C. in the presence of a solid oxidic cyclisation catalyst comprising 5 to 40 percent of chromium oxide, 1 to 10 percent of potassium oxide, 0.5 to 5 percent of cerium oxide, and 93.5 to 45 percent of γ-aluminum oxide.

6. A process for preparing aromatic hydrocarbons containing less than twelve carbon atoms, which comprises heating an aliphatic hydrocarbon having substantially twelve carbon atoms, said aliphatic hydrocarbon being selected from the group consisting of polymerization products of propylene, polymerization products of the butylenes, hydrogenation products thereof, mixtures thereof, mixtures of said hydrocarbons with a lower polymer product of said olefins and hydrogenation products of such mixtures at a temperature in the range from about 400° C. to 650° C. in the presence of a solid oxidic cyclisation catalyst comprising a compound selected from the group consisting of metal oxides of chromium, molybdenum, and tungsten and mixtures thereof.

7. A process according to claim 6 wherein said heating is effected in the presence of at least one carrier gas.

8. A process for preparing aromatic hydrocarbons containing less than twelve carbon atoms, which comprises heating an aliphatic hydrocarbon having substantially twelve carbon atoms, said aliphatic hydrocarbon being selected from the group consisting of polymerization products of propylene, polymerization products of the butylenes, hydrogenation products thereof, mixtures thereof, mixtures of said hydrocarbons with a lower polymer product of said olefins and hydrogenation products of such mixtures at a temperature in the range from about 475° C. to 550° C. in the presence of a solid oxidic cyclisation catalyst comprising a compound selected from the group consisting of metal oxides of chromium, molybdenum, and tungsten and mixtures thereof.

9. A process for preparing aromatic hydrocarbons containing less than twelve carbon atoms, which comprises heating an aliphatic hydrocarbon having substantially twelve carbon atoms, said aliphatic hydrocarbon being selected from the group consisting of polymerization products of propylene, polymerization products of the butylenes, hydrogenation products thereof, mixtures thereof, mixtures of said hydrocarbons with a lower polymer product of said olefins and hydrogenation products of such mixtures at a temperature in the range from about 400° C. to 650° C. for a contact time in the range from about 0.1 to about 60 seconds in the presence of a solid oxidic cyclisation catalyst comprising a compound selected from the group consisting of metal oxides of chromium, molybdenum, and tungsten and mixtures thereof.

10. A process for preparing p-xylene which comprises heating a crude dimerisation product of iso-butylene containing 10 to 50 percent of triisobutylene at a temperature in the range from about 400° C. to 650° C. in the presence of a solid oxidic cyclisation catalyst comprising a compound selected from the group consisting of metal oxides of chromium, molybdenum, and tungsten and mixtures thereof.

11. A process for preparing aromatic hydrocarbons having less than twelve carbon atoms which comprises heating triisobutylene to a temperature ranging between about 400 and 650° C. in the presence of a solid oxidic cyclization catalyst comprising a compound selected from the group consisting of metal oxides of chromium, molybdenum and tungsten and mixtures thereof.

12. A process for preparing aromatic hydrocarbons having less than twelve carbon atoms which comprises heating tetrapropylene to a temperature ranging between about 400 and 650° C. in the presence of a solid oxidic cyclization catalyst comprising a compound selected from the group consisting of metal oxides of chromium, molybdenum and tungsten and mixtures thereof.

References Cited in the file of this patent

UNITED STATES PATENTS 2,785,209   Schmetterling et al. _____ Mar. 12, 1957